June 25, 1929. C. B. SPALSBURY Re. 17,339
METHOD OF MAKING BOOTS AND SHOES
Original Filed April 19, 1922 3 Sheets-Sheet 1
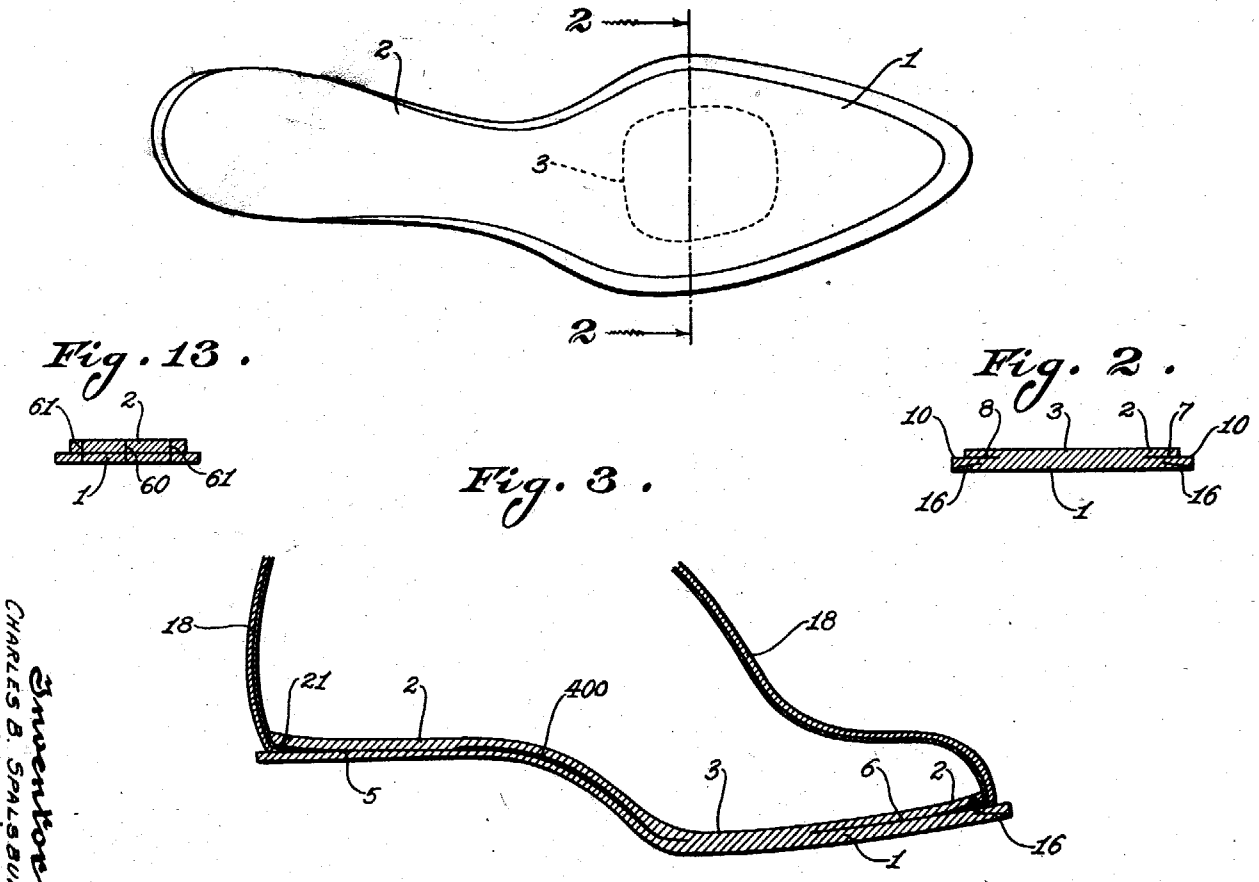
Inventor:
CHARLES B. SPALSBURY,
By John N. Brumiga
His Attorney.

June 25, 1929. C. B. SPALSBURY Re. 17,339
METHOD OF MAKING BOOTS AND SHOES
Original Filed April 19, 1922 3 Sheets-Sheet 2
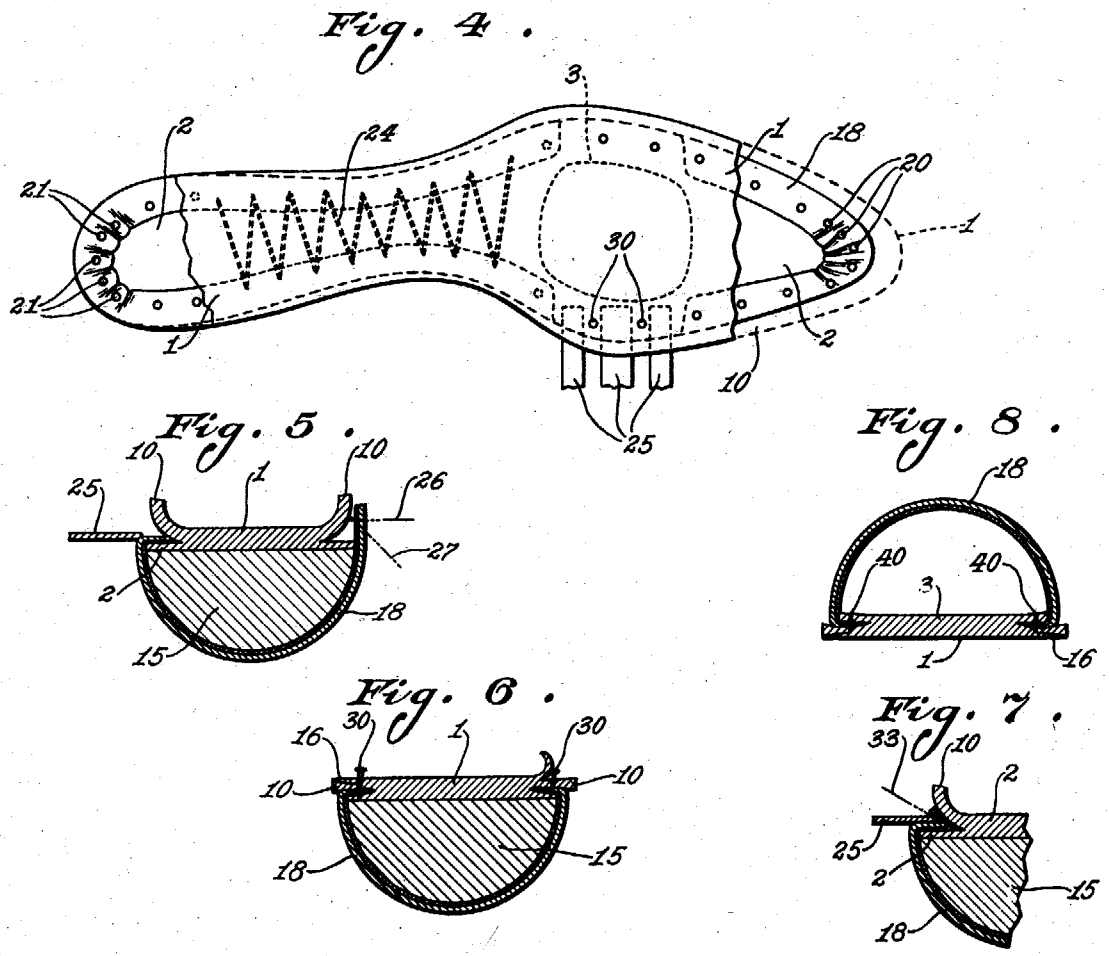
Inventor:
CHARLES B. SPALSBURY,
By John N. Bruninga
His Attorney.

June 25, 1929. C. B. SPALSBURY Re. 17,339
METHOD OF MAKING BOOTS AND SHOES
Original Filed April 19, 1922 3 Sheets-Sheet 3
Fig. 9.
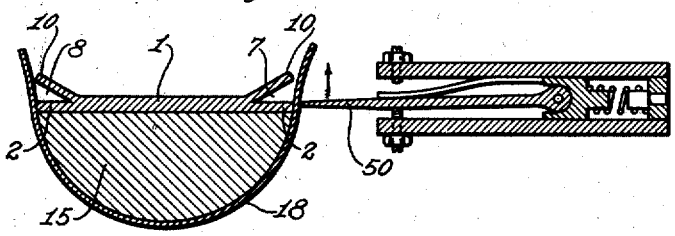
Fig. 10.
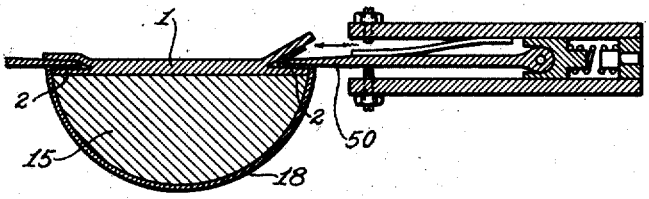
Fig. 11.
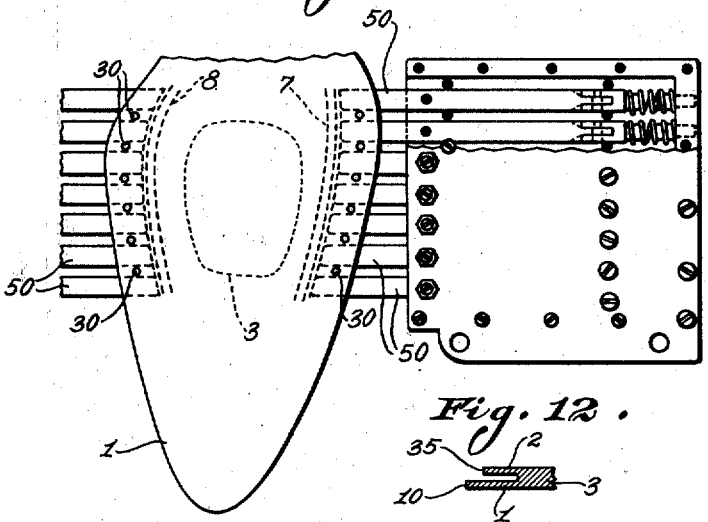
Fig. 12.
Inventor:
CHARLES B. SPALSBURY,
By John N. Breuninga
His Attorney.

Reissued June 25, 1929. Re. 17,339

UNITED STATES PATENT OFFICE.

CHARLES B. SPALSBURY, OF ST. LOUIS, MISSOURI, ASSIGNOR TO JOHNSON, STEVENS & SHINKLE SHOE COMPANY, OF ST. LOUIS, MISSOURI, A CORPORATION OF MISSOURI.

METHOD OF MAKING BOOTS AND SHOES.

Original No. 1,572,042, dated February 9, 1926, Serial No. 555,588, filed April 19, 1922. Application for reissue filed November 2, 1927. Serial No. 230,670.

My present invention relates to the manufacture of boots and shoes and to an improved boot or shoe construction resulting from my novel process. In carrying out my present novel process I may utilize a novel type of lasting machine, shown and described in my copending application, Ser. No. 630,131, filed April 5, 1923, now patent No. 1,580,449, issued April 13, 1926. I have illustrated herein a portion only of a lasting machine adapted for performing the method embodying this invention, in order to more clearly describe and show the preferred embodiments and methods employed in carrying out my present invention.

In the manufacture of boots and shoes as at present carried out in modern factory methods, it is most important to utilize, so far as possible, the various established steps, machines and recognized labor conditions affecting the same, with comparatively slight changes, and I have carried out this condition in the development of my present novel process. In other words, I am able to utilize practically all the present well-established and high speed preliminary machines and operations and yet to manufacture shoes by my process, with comparatively slight changes and by the addition of a single machine or only a few machines. It will be appreciated that the process can be carried out by hand, although I have developed the novel machine above referred to to expedite the method herein partially illustrated and described.

An important object of my present invention is to manufacture a boot or shoe which will be extremely flexible and also to manufacture a shoe substantially without permanent lasting tacks therein, excepting only at the heel and toe, if desired. In fact, my present shoe and the method of making same, produces a resulting flexible product substantially equivalent in desirability, marketability and quality to the best grades of turn shoe construction, without the turning method, while it may still employ a single sole, or a laminated sole with the layers or insole and outsole portions united.

Another object is to provide a method whereby the upper is so lasted and retained as to closely conform to the last, while obviating to a large extent the presence of lasting tacks in the completed shoe.

Another object is to provide a method whereby the lasted upper is temporarily tacked while the latter is held under tension due to the lasting so as to be retained in the desired close conformation to the last.

Another object is to provide a method whereby the upper is retained in conformation with the last while the sole is seamed thereto, although obviating to a large extent the presence of lasting tacks in the completed shoe, especially in the forepart.

Further objects and features will appear from the detail description, taken in connection with the accompanying drawings.

Generally stated, in accordance with this invention, the upper is so lasted as to conform closely to the last; this is accomplished, in accordance with one embodiment, by wiping the upper over an insole part on the last and substantially continuously therealong, as by moving closely spaced wipers over the insole part and at closely adjacent points therealong. An outsole part is then laid on and temporarily tacked to the lasted upper and while the latter is held under tension due to the wiping; this is accomplished, in accordance with one embodiment, by inserting temporary lasting tacks through the outsole part into the lasted upper at points between the closely spaced wipers and while the latter are in wiping relation. The sole and upper are thus retained in assembled relation and in close conformity to the last; the wiping means can then be withdrawn while the parts are so retained. The last can then be withdrawn and the upper and sole parts permanently secured together, as by seaming or stitching through the sole and upper; the lasting tacks can then be withdrawn. There is thus provided a shoe which is not only substantially free of tacks, especially along the forepart, but which conforms closely to the last on which it was made.

In carrying out my present method I may, in accordance with one embodiment of this invention, utilize the usual practice of sorting soles for grade and weight, skiving the same to a uniform thickness by any suitable machine or machines, also rounding the soles, and then I specially prepare the same, splitting the sole from the heel to and including the shank portion, as well as around the margin of the forepart and toe. This forms substantially an insole and an outsole portion, leaving the grain side of the leather for the tread surface and outsole part of the shoe, which may be of greater or any desired extent of thickness. I may vary this thickness as desired, giving a greater proportion of the sole for the tread or outsole part from the shank to the toe portion and a greater thickness or proportion for the shank or heel part on the insole portion, this being readily effected on any well-known splitting machines, with slight changes and adjustments if desired. Preferably I form this marginal split portion around the forepart simply as a cutting or splitting action, but if desired I may also cut out or remove a small thickness of the leather for the purpose of affording room for the upper materials to be lasted and concealed therein as will be hereinafter more fully described. I may also cut away or trim down the marginal edge of the insole portion, cutting it back slightly to permit the marginal part of the outsole to extend beyond the insole in substantially similar position as a McKay outsole is made to extend over a McKay insole. This operation can be readily effected by any cutting machine, particularly the well-known sole rounders now in general use. Or I may prepare a sole by uniting a separate or usual set of McKay insole and outsole, thus producing soles of layers, or laminated with the marginal recesses to receive the lasted upper between the layers. The insole when prepared is then applied to a last, the upper materials assembled thereon, and pulled over either by hand or machine and thereupon the shoe is lasted. This lasting operation may be effected by hand or/and preferably by my special machine as shown in said Patent No. 1,580,449, issued April 13, 1926. In either instance the upper materials are pulled over and tacked in lasted position at toe and heel, to the insole portion of the sole, the outsole portion being turned back or raised for this purpose, if desired. The heel and shank may be lasted without difficulty, as the insole member is in proper and convenient and assembled position and the outsole portion split therefrom is readily removable. I contemplate lasting the heel seat by clinching tacks thereon as is customary in welt shoe manufacture, and then securing the shank portion by non-metallic means, such for example as by cross-stitching, cementing or the like. This step enables me to make a more flexible shoe and one substantially without lasting tacks throughout the shank and forepart, as well as free of tacks in the shank, if desired.

With the shoe thus partially lasted and the upper secured at heel and toe and preferably at the shank also, I then effect the novel lasting method which is of great importance in this shoe construction. This lasting consists, in accordance with one embodiment of this invention, in forcing the upper materials into the marginal split or recessed portion along each side of the forepart between the insole and outsole parts of the sole. I contemplate several different methods of accomplishing this lasting action. I may either trim off the upper materials at a point sufficient to allow for the stretching and lasting action and tucking in the marginal edge of the upper so as not to bunch or crowd the split portion of the sole; or I may force the upper materials in, leaving the same doubled over the lasting instrumentalities, and then cut off the surplus material by the action of a cutting tool, preferably a thin bladed knife, or I may leave the doubled over upper just as thus forced into its marginal edge, particularly if the sole is partly cut away or recessed of suitable thickness to receive this doubled over part of the upper materials. In either method I prefer to secure the lasted upper by a novel process of driving lasting tacks or other temporary fastening devices entirely through the outsole and insole portions engaging the upper where doubled over, or cut, into and between the two split portions. This application of lasting tacks is made before the lasting instrument is withdrawn, so that the upper is held in its stretched or strained and lasted position directly in the marginal part. With the shoe thus lasted I may then draw the last and apply through and through stitching in the same manner as utilized in McKay shoe stitching, uniting the lasted upper to both insole and outsole portions of the sole. This stitching may be put in entirely around the toe, if desired, and around the heel also, but may only be applied from just short of the toe portion along the forepart and shank to the heel portion, the heel seat being preferably tacked and the extreme toe portion where pointed models are employed also would ordinarily be tacked. After stitching I remove the lasting tacks, unless previously withdrawn, either method being possible.

The resulting product gives me a novel type of boot or shoe, substantially free of metallic fastenings, lasting tacks or the like, and yet with a strong stitching and furthermore producing an extremely flexible shoe construction, combining the desirable and eliminating the undesirable features of both the turn and McKay shoe construction. Moreover, the shoe will present a finished appearance and shape, since it conforms closely to the last on which it was made, because the upper was tacked and retained not only while under tension due to the wiping around and over the last, but while the upper was wiped substantially continuously therealong, particularly along the forepart.

The method of making this shoe constitutes the novel steps above generally and briefly outlined, particularly the feature of cutting the insole and outsole portions with varying thicknesses; the lasting step and particularly the feature of trimming and cutting the upper materials to fit the depth of the marginal split or cut portion or the recessing of the sole to fit the upper materials; the method of tacking by temporary stay or lasting tacks through the upper, insole and outsole; and more particularly the feature of wiping the upper over an insole part on the last and laying an outsole part on and temporarily tacking the same to the lasted upper while the latter is held under tension due to the wiping. This method is distinctly novel, and I wish to claim the same broadly.

With the shoe upper and outsole stitched, it may then be relasted, the heel applied and shoe finished in any desired manner, by well known methods, processes and established machines therefor.

Referring to the drawings, illustrating the preferred embodiment of carrying out my invention, Fig. 1 is a plan view of my prepared sole;

Fig. 2 is a cross-sectional view on the line 2—2 of Fig. 1;

Fig. 3 is a longitudinal sectional view showing the insole of Figs. 1 and 2 incorporated in a shoe;

Fig. 4 is a plan view of a lasted shoe showing the outsole portion removed at toe and heel with the toe and heel attached by permanent lasting tacks;

Fig. 5 is a cross-sectional view illustrating the lasting and showing one method of trimming the shoe upper along the forepart prior to lasting;

Fig. 6 is a cross-sectional view showing different methods of driving temporary lasting tacks;

Fig. 7 is a fragmentary cross-sectional view illustrating lasting along the margin of the forepart;

Fig. 8 is a cross-sectional view illustrating a completed shoe construction;

Fig. 9 is a cross-sectional view illustrating one step in the lasting machine method;

Fig. 10 being a similar cross-sectional view showing the second lasting machine step at the marginal sides and forepart;

Fig. 11 being a fragmentary plan view corresponding to that of Fig. 10;

Fig. 12 is a fragmentary, cross-sectional, marginal view of the sole prepared with a recessed portion of sufficient extent to allow the upper materials to be embedded and lasted therein without trimming; and Fig. 13 is a cross-sectional view illustrating a feasible method of forming a laminated sole, readily accomplished by uniting the ordinary insole and outsole intended for McKay footwear.

Referring to the drawings, the shoe sole is shown after it is prepared for use, in accordance with certain embodiments of this invention. The sole is preferably of usual sole leather and of suitable thickness and quality for the particular shoe in which it is to be incorporated. As the sole when completed, in accordance with certain embodiments of this invention, is in effect a combined outsole and insole, I will define the same as consisting of an outsole portion 1 and the insole portion 2, these two portions being left united at a substantial portion of the forepart at 3. The sole blank is sorted, graded and skived as above explained, preferably marked or stamped with the appropriate size and grade or number of "irons," is rough rounded to substantially the contour shown in the drawing of the outsole portion 1, is then split in from the heel and shank as shown at 5 and around the toe portion as illustrated at 6 and also on the side margins of the forepart as shown at 7 and 8, thus leaving the connecting ligature 3. The upper or insole part on 2 is then separately rounded to substantially the configuration illustrated in Fig. 1, i. e., to a reduced size in order to leave the extension or margin on the outsole part 1 as clearly shown at 10, 10, Fig. 2. This margin, of course, can be of any size, extent, or style desired. With the sole thus prepared, it is then assembled on a last 15 by one or more tacks as usual. If desired, I may channel the marginal part of the outsole 1 throughout the forepart and shank, as shown at 16, to conceal the stitches, this being a customary method. The upper materials, consisting in the upper and lining, designated at 18, are then assembled and the shoe is "pulled over" and lasted. At the toe and heel portions, as shown in Fig. 4, the upper materials 18 may be permanently secured by lasting tacks 20 to the insole portion at the toe and at the heel by lasting tacks 21. A counter and box toe can of course be added if desired. As shown in Fig. 3, the toe portion may be temporarily lasted to the insole part 2. To facilitate this lasting and tacking operation the outsole portion 1 may be turned backwardly or held backwardly by the operator and the tacks driven in through the insole portion. The lasting can be then continued, preferably at the shank by hand or hand method laster, the assembled and pulled over shoe being preferably in position in a bed lasting machine for the hand operation, or in my improved special lasting machine covered in my Patent No. 1,580,449, issued April 13, 1926. I may tack the shank portion or, and preferably will, secure the shank part of the upper by temporary lasting tacks only and permanently secure the same by a line of stitching 24, see Fig. 4. This permits the lasting tacks to be removed and facilitates flexibility and a non-metallic shoe construction.

With the shoe thus far lasted, viz., the toe, heel and shank, it is then ready for lasting at the marginal sides at the forepart, within the split portion 7 and 8. For this operation several methods may be carried out. The method shown in Fig. 5 consists in pulling and lasting the upper materials 18 until substantially the limit of stretching and fitting has been reached, and thereupon the surplus upper materials would be severed by a sharp knife or cutter, either on the line 26 or slantingly, to give a beveled part on the line 27 (see Fig. 5) at the right. The upper material is then forced into position, while the outsole edges 10 are held out, in any suitable manner, by a lasting instrument 25, forcing the upper material smoothly, firmly and completely, over the last and over the insole part thereon, into the depth provided by the marginal split openings 7 and 8. With the upper then in this position, the outsole is laid or turned down and a lasting tack 30 driven into position to hold the lasted upper 18 into its lasted position. This lasting tack 30 may be driven entirely through the outsole portion, as shown in Fig. 6, at the left, or may be driven through the flap afforded by the channel 16, as shown at the right, Fig. 6. A further acceptable method of lasting consists in the arrangement shown in Fig. 7, wherein the upper materials 18, after having been lasted and held in position by the lasting instrument 25, has the surplus material severed by a sharp knife on the line 33, Fig. 7. Thereupon the outsole portions are moved down and the lasting tacks applied as already described. These lasting tacks may and preferably will be applied between the lasting instrument 25, or a plurality of the same, as shown in Fig. 4, the lasting tacks 30 being driven entirely through a portion of the outsole, the upper materials and the insole part, between the spaces afforded by the lasting instruments 25 or slots in one of such instruments, as will be noted in Fig. 11, where my machine operation is shown.

A still further method of effecting this lasting around the ligature 3 is shown in Fig. 10. In this form, the outsole part has a small section removed, as best seen in Fig. 12, leaving a substantial recess 35 therein, of suitable width to receive the doubled surplus upper materials 18, which are forced into position by the lasting machine, as shown in Fig. 10. In this form the outsole portion is simply forced down on top of the doubled upper materials and the lasting tacks driven through between the openings afforded by the lasting fingers 50. This method, of course, can be utilized either by my machine or by hand operations or otherwise. Whichever method is used, after the tacks are inserted through the outsole part and the upper while the latter is under tension due to the wiping, the lasting means or wipers can be withdrawn, leaving the parts retained by the tacks; the outsole part can now be pressed down on the upper, as shown in Fig. 6, so as to close the space left by the wipers.

With the upper materials thus lasted and secured to the sole, I can then withdraw the last and apply through and through stitching forming the seam 40, passing through the insole portion 2, the upper materials 18, where they are engaged between the two insole and outsole portions, thus permanently uniting sole and upper together. This stitching would be set through the outsole channel 16 in case the same has been cut. As illustrated in Figs. 9, 10 and 11, wherein a fragmentary portion of my novel and special machine is shown, I perform the lasting operations substantially as above described, but with the added feature of providing a plurality of yielding reciprocable wiper fingers 50, placing these lasting fingers first in contact with the upper materials, below the marginal split portion and below the insole portion, then effecting a relative vertical movement between the assembled upper, sole and last, and the lasting machine, so as to secure a wiping action between the edges of the fingers 50 and the upper 18. Then I effect a forward movement of the lasting fingers, preferably simultaneously, to wipe and push the upper into and over the insole portions 2. When in this position, as shown in Fig. 10, the surplus marginal edge of the upper materials 18 may be cut off, if not previously cut off in the manner illustrated in connection with Fig. 5, or if the sole has the recess 25 to receive the same, the entire doubled upper may be left in said recess and the outsole portion tacked down thereover between the fingers 50. The fingers are then withdrawn and the shoe is completely lasted.

At this point also I may apply the usual shank stiffener 400,—see Fig. 3,—securing the same in any suitable and desirable way. The outsole is then applied and tacked in position, the resulting heel nailing operation firmly securing the heel portion of the outsole to the heel seat of the shoe. My lasting machine is not specifically claimed herein, nor is it shown in detail, the fragmentary portions in Figs. 9, 10 and 11 being illustrative only to show a series of yieldingly spaced lasting fingers 50 through which the lasting tacks 30 may be driven, while the fingers 50 are in position, holding the upper and insole in lasted position. The means of operating these fingers 50 in unison is more clearly shown in my said patent covering the lasting machine, and in Patent No. 1,588,916, June 15, 1926.

As shown in Fig. 3, I may prefer to form the heel splitting and forepart splitting operations at a different relative position throughout the sole with regard to thickness. At the forepart it is most desirable to have the outsole 1 of greatest possible thickness, and therefore the split portions 6 and 7 show a relatively small proportion of the sole for the insole 2 and a relatively greater proportion for the outsole 1. Throughout the shank and heel, however, it is more desirable to have the insole of greater strength and thickness, as there is no direct wear on the outsole and therefore I form the heel splitting on the line 5 at a relative point nearer the bottom surface of the outsole, leaving the insole portion 2 of substantial extent.

With my shoe as thus made, an extremely simple and efficient series of operations are possible, the usual and well-known shoe manufacturing machines, steps, skilled labor and methods of manufacture are embodied without serious interruption or practical difficulty. My shoe, therefore, is readily adapted to modern shoe factory manufacturing methods. A resulting shoe is produced which has great flexibility, is free of lasting tacks,—excepting only at the heel seat and at the toe portion if desired,—has no expensive welt and channeling operations, is free of the action and danger of turning incident to turned shoe construction and can yet result in a single soled shoe substantially equal in every way to turn shoes for comfort and marketability and greatly superior thereto in wear, economy of construction and general satisfaction.

Where I use a laminated sole, as shown in Fig. 13, the insole and outsole members may be united by a single line of stitching 60, or a pair of rows of stitching 61, at each marginal edge, leaving a sufficient extent of the insole and outsole portions separated to form the recess in which the marginal edge of the upper is forced and lasted. This temporary or permanent uniting of the insole and outsole by stitching 60, 61, adhesive, tacks, or other means, is only necesary at the forepart, equivalent to the ligature 3. In fact, I consider it entirely feasible to manufacture McKay shoes with insole and outsole of present weight, grade and thickness by first uniting the insole and outsole at the central portion of the forepart as herein illustrated, and then proceeding in accordance with my method, and my broader claims are intended to cover such a sole, being in effect a single sole for the purposes of the various steps in carrying out my invention.

While I have specifically described a procedure in which the operations are performed on a shoe having a sole composed of an insole part and an outsole part joined together, it will be understood that the same is merely illustrative of one embodiment of this invention and not limitative; for this invention, as far as method and procedure are concerned, is applicable in many cases to shoes having other forms and types of soles. It will furthermore be understood that certain features, steps and subcombinations are of utility and may be employed without reference to other features and steps; that is contemplated by and is within the scope of the appended claims. It is further obvious that various changes may be made in the details of procedure, within the scope of the appended claims, without departing from the spirit of this invention; it is, therefore, to be understood that this invention is not to be limited to the details described and/or shown.

Having thus described the invention, what is claimed is:

1. That improvement in the art of making boots and shoes which comprises providing a sole having outsole and insole portions, assembling the sole and upper materials on the last, lasting the upper, securing a portion of the lasted upper between said insole and outsole portions by lasting tacks driven through the outsole, upper, and insole portions, withdrawing the last and uniting the upper and insole and outsole portions by through and through stitching.

2. The improved method of making shoes comprising providing a combined insole and outsole having an upper receiving recess at at the sides of the forepart, lasting the upper in said recess, securing the lasted upper by fastenings engaging the combined insole and outsole and the upper, and thereafter completing the shoe by through and through stitching.

3. The improved method of making shoes consisting in providing a combined insole and outsole having an upper receiving recess at the sides of the fore part, lasting the upper in said recess, and securing the lasted upper by temporary fastenings engaging the combined insole and outsole, and thereafter completing the shoe by through and through stitching.

4. The improved method of making shoes consisting in providing a combined insole and outsole having an upper receiving recess at the sides of the fore part, lasting the upper in said recess, securing the lasted upper by temporary fastenings engaging the combined insole and outsole, said temporary lasting means being applied closely adjacent the lasting devices, removing the last and completing the shoe by through and through stitching and withdrawing said temporary fastenings.

5. The improved method of making a single soled shoe consisting in forming the sole with a recess to receive the upper materials in the marginal portions of the sole, lasting the upper therein, trimming and securing the lasted upper therein by temporary fastenings extending through the upper and the sole portions forming said recess, withdrawing the last and permanently uniting the upper and sole by through and through stitching.

6. The improved method of making shoes, consisting in providing combined insole and outsole portions, having said insole and outsole portions separated at the heel, shank, toe, and along the margin of the forepart, lasting the upper, attaching the shank portion of the lasted upper by non-metallic means, securing the marginal part of the lasted upper at the forepart between said insole and outsole portions by removable fasteners, removing the last, applying through and through stitching, and thereupon removing the fasteners, retaining the lasted upper at each side of the forepart.

7. The improved method of making a shoe having an insole and outsole and through and through stitching, which consists in first uniting said insole and outsole at the central portion of the forepart, then assembling said combined insole and outsole as a single sole upon a last with an upper, lasting the upper, securing the lasted upper to the insole member, removing the last and applying the through and through stitching.

8. The improved method of making a shoe having an insole and outsole and through and through stitching, which consists in first uniting said insole and outsole at the central portion of the forepart, then assembling said combined insole and outsole as a single sole upon a last with an upper, lasting the upper, securing the lasted upper to the insole member, removing the last and applying through and through stitching, and thereafter removing the upper retaining means applied to hold the lasted upper until the through and through stitching is applied.

9. In the art of making shoes, the method comprising, wiping the upper over an insole part on a last, laying on outsole part on and temporarily tacking the same to the lasted upper while the latter is held under tension due to the wiping, and permanently securing the tacked sole and upper together.

10. In the art of making shoes, the method comprising, wiping the upper over an insole part on a last, laying an outsole part on the lasted upper and inserting tacks through the outsole part and into the lasted upper while the latter is held under tension due to the wiping, and seaming the sole to the upper and removing the tacks.

11. In the art of making shoes, the method comprising, wiping the upper over an insole part on a last, laying an outsole part on the lasted upper and inserting tacks through the outsole part and into the lasted upper while the latter is held under tension due to the wiping, releasing the wiping action after insertion of the tacks, removing the last, and seaming through the outsole part, upper and insole part.

12. In the art of making shoes, the method comprising, wiping the upper over an insole part on a last, laying an outsole part on the wiping means and temporarily tacking the outsole part to the lasted upper while the latter is held by the wiping means, and withdrawing the wiping means after such tacking.

13. In the art of making shoes, the method comprising, wiping the upper over an insole part on a last, laying an outsole part on the wiping means and inserting tacks through the outsole part and into the lasted upper while the latter is held by the wiping means, and withdrawing the wiping means after insertion of the tacks.

14. In the art of making shoes, the method comprising, wiping the upper over an insole part on a last and substantially continuously therealong, laying an outsole part on and temporarily tacking the same to the lasted upper while the latter is held under tension due to the wiping, and permanently securing the tacked sole and upper together.

15. In the art of making shoes, the method comprising, wiping the upper over an insole part on a last and at closely adjacent points therealong, and laying an outsole part on and inserting tacks through the outsole part and into the lasted upper between those points while the upper is held under tension due to the wiping.

16. In the art of making shoes, the method comprising, moving closely spaced wipers over an insole part on a last so as to wipe the upper thereover, laying an outsole part on the wiper and inserting tacks through the outsole part and into the lasted upper at points between the wipers while the upper is held by the wipers, and withdrawing the wipers after insertion of the tacks.

17. In the art of making shoes, the method comprising, laying an edge-divided sole on a last, turning back the outsole part, wiping an upper over the insole part, turning the outsole part on and temporarily tacking the same to the lasted upper while the latter is held under tension due to the wiping, and permanently securing the tacked sole and upper together.

18. In the art of making shoes, the method comprising, laying an edge-divided sole on a last, turning back the outsole part, wiping the upper over the insole part, turning the outsole part back and inserting tacks therethrough and into the lasted upper while the latter is held under tension due to the wiping, removing the last, and seaming through the outsole part, upper and insole part.

In testimony whereof I affix my signature this 28th day of October, 1927.

CHARLES B. SPALSBURY.